United States Patent

[11] 3,564,998

[72] Inventors John R. Johnson;
 Jack H. Myers, Toledo, Ohio
[21] Appl. No. 759,704
[22] Filed Sept. 13, 1968
[45] Patented Feb. 23, 1971
[73] Assignee Owens-Illinois, Inc.

[54] CHUCK FOR MANIPULATING BOTTLES IN A BOTTLE DECORATING APPARATUS
18 Claims, 12 Drawing Figs.

[52] U.S. Cl. .................................................. 101/40,
 198/33
[51] Int. Cl. .................................................. B41f 17/20,
 B65g 47/24
[50] Field of Search ........................................ 101/38-
 —40, 115, 123, 124, 126; 198/33 (R)2, 19,
 22(Cursory)

[56] References Cited
UNITED STATES PATENTS
2,132,818 10/1938 Cone ............................. 101/123X

| | | | |
|---|---|---|---|
| 2,157,638 | 5/1939 | Soubier ........................ | 101/123X |
| 2,183,223 | 12/1939 | Mankin et al. ................ | 101/124 |
| 2,721,516 | 10/1955 | Campbell et al. ............. | 101/38X |
| 2,762,299 | 9/1956 | Martin et al. ................. | 101/115 |
| 2,882,818 | 4/1959 | Vowles ......................... | 101/126 |
| 2,963,140 | 12/1960 | Barton .......................... | 198/19 |
| 3,356,019 | 12/1967 | Zurick ........................... | 101/39 |
| 3,357,349 | 12/1967 | Decker et al. ................. | 101/129X |

Primary Examiner—Robert E. Pulfrey
Assistant Examiner—Clifford D. Crowder
Attorneys—J. R. Nelson and W. A. Schaich

ABSTRACT: A bottle supporting and manipulating chuck for conveying bottles in a decorating or label applying operation. The chuck receives bottles in random rotative orientation, rotatively orients the bottles, projects them into engagement into a flat decorating element, and rolls the bottle laterally across the surface of the decorating element to apply a label or decoration to a preselected circumferential portion of the bottle surface.

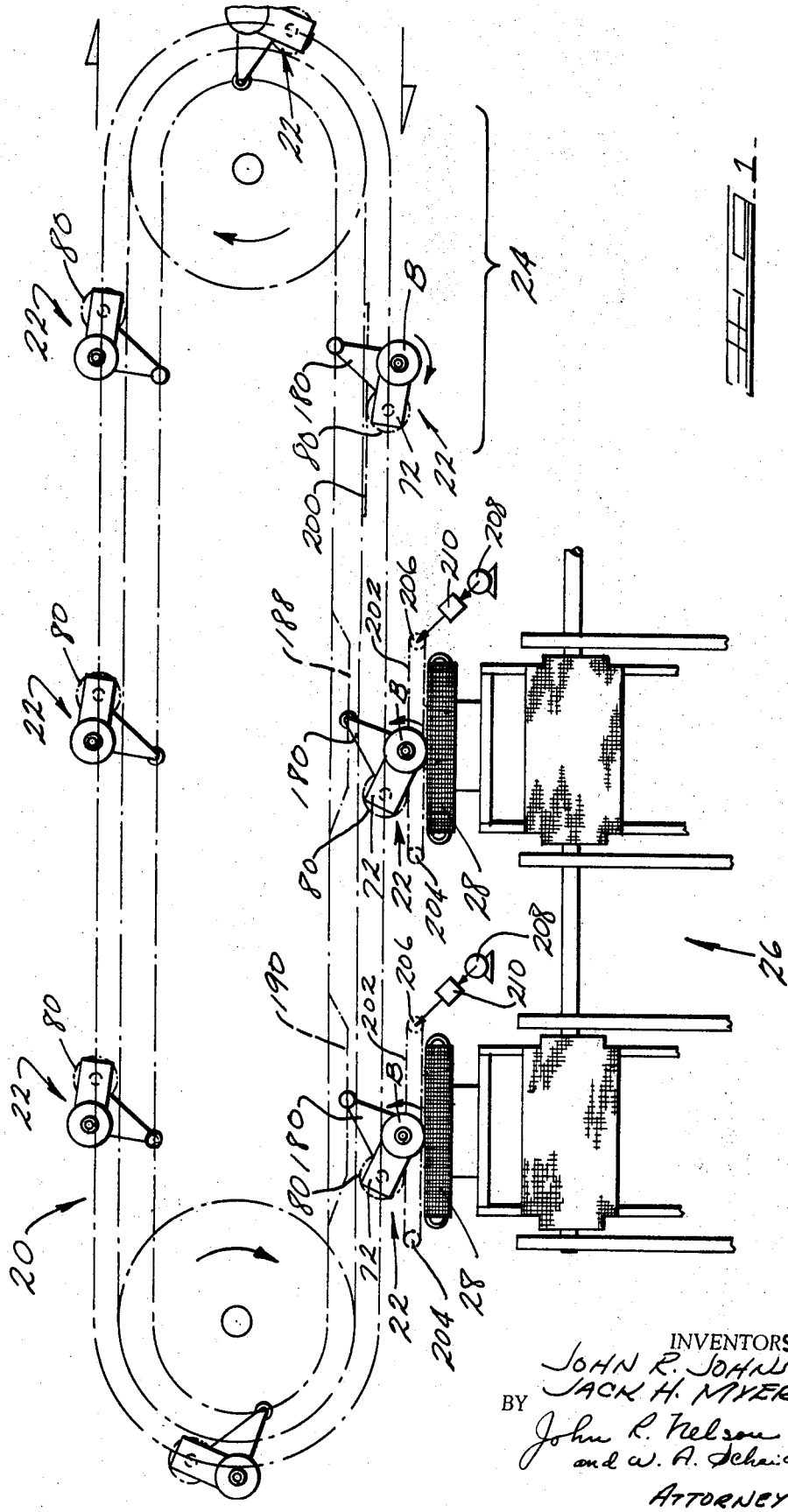

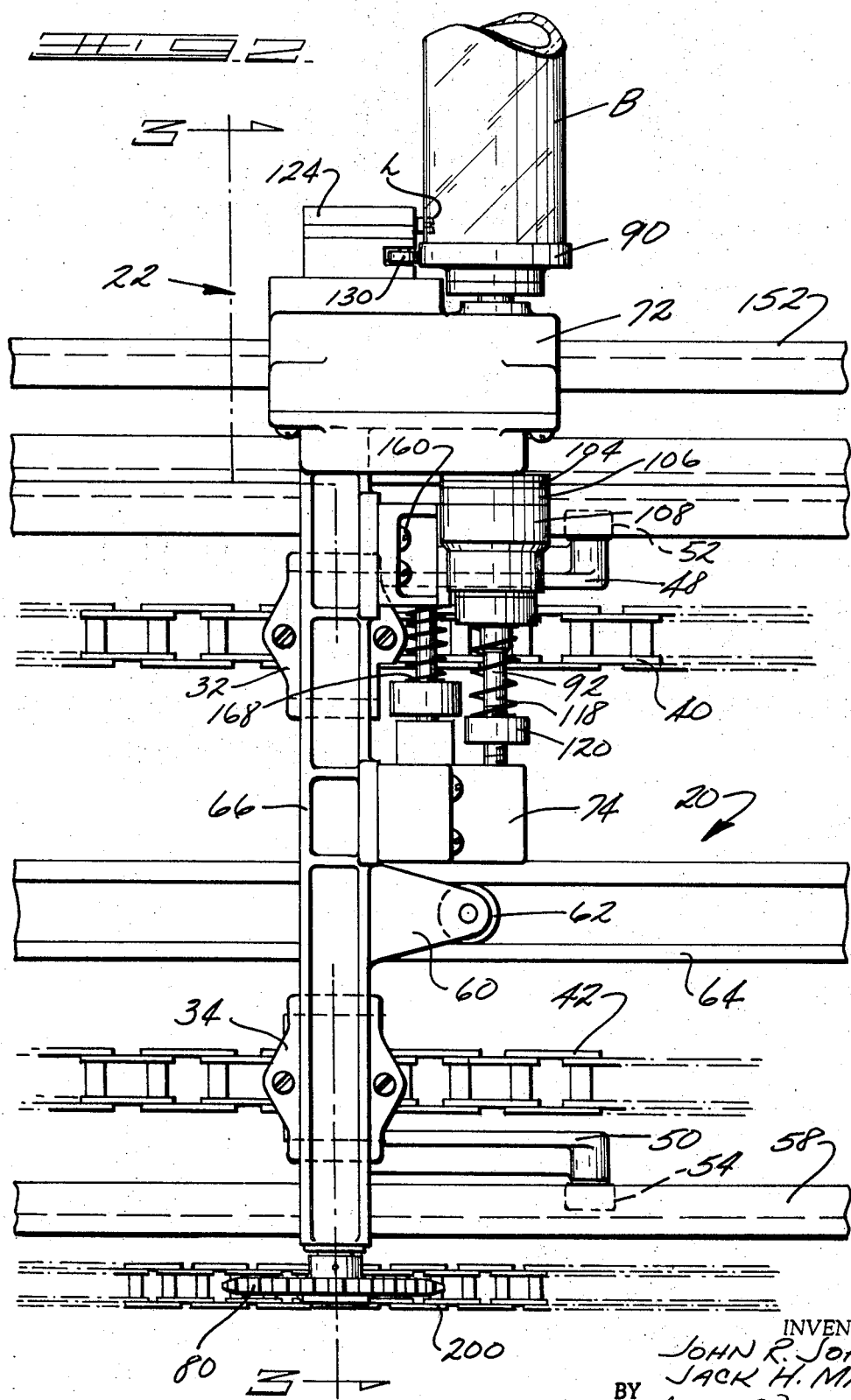

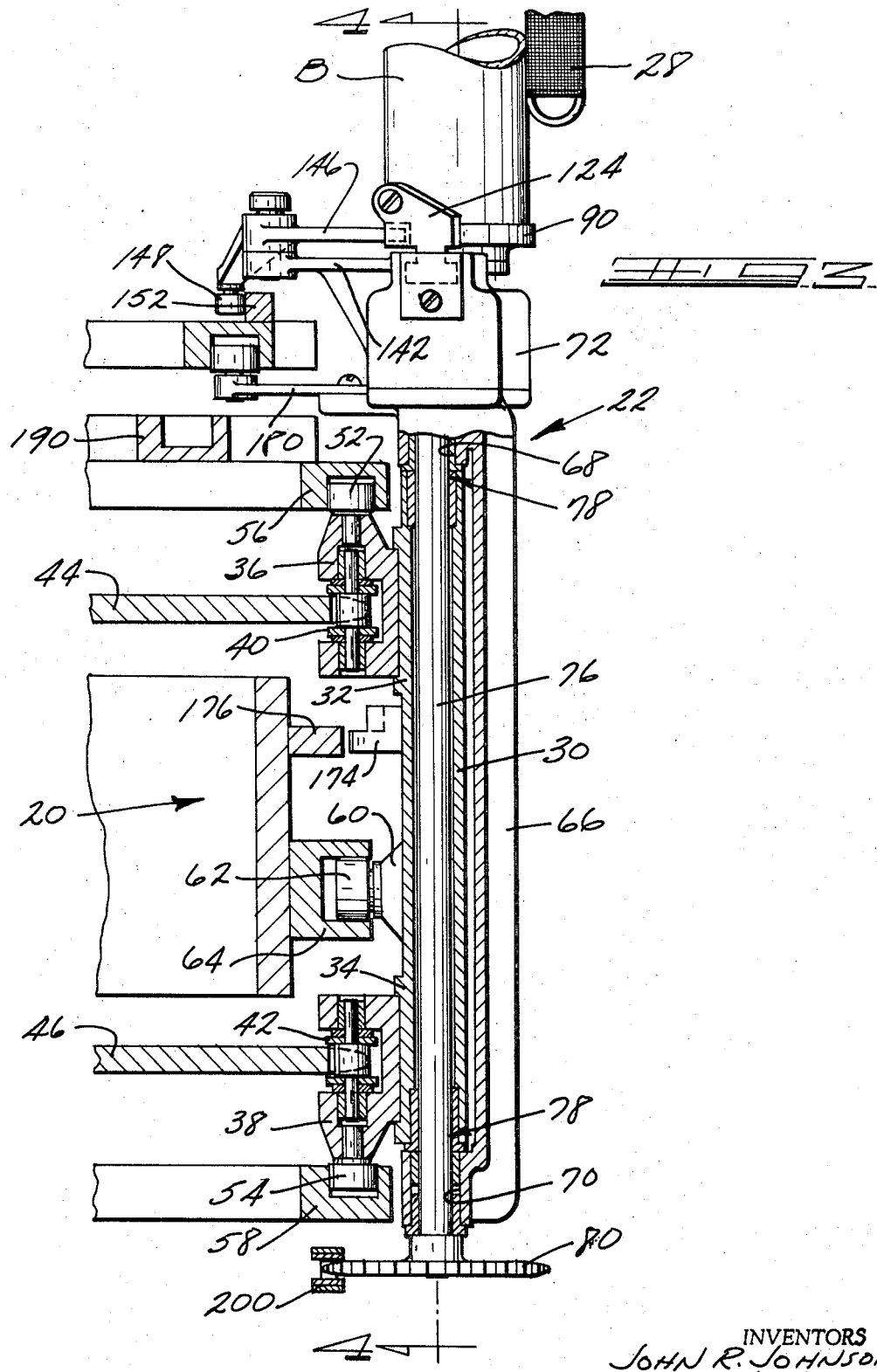

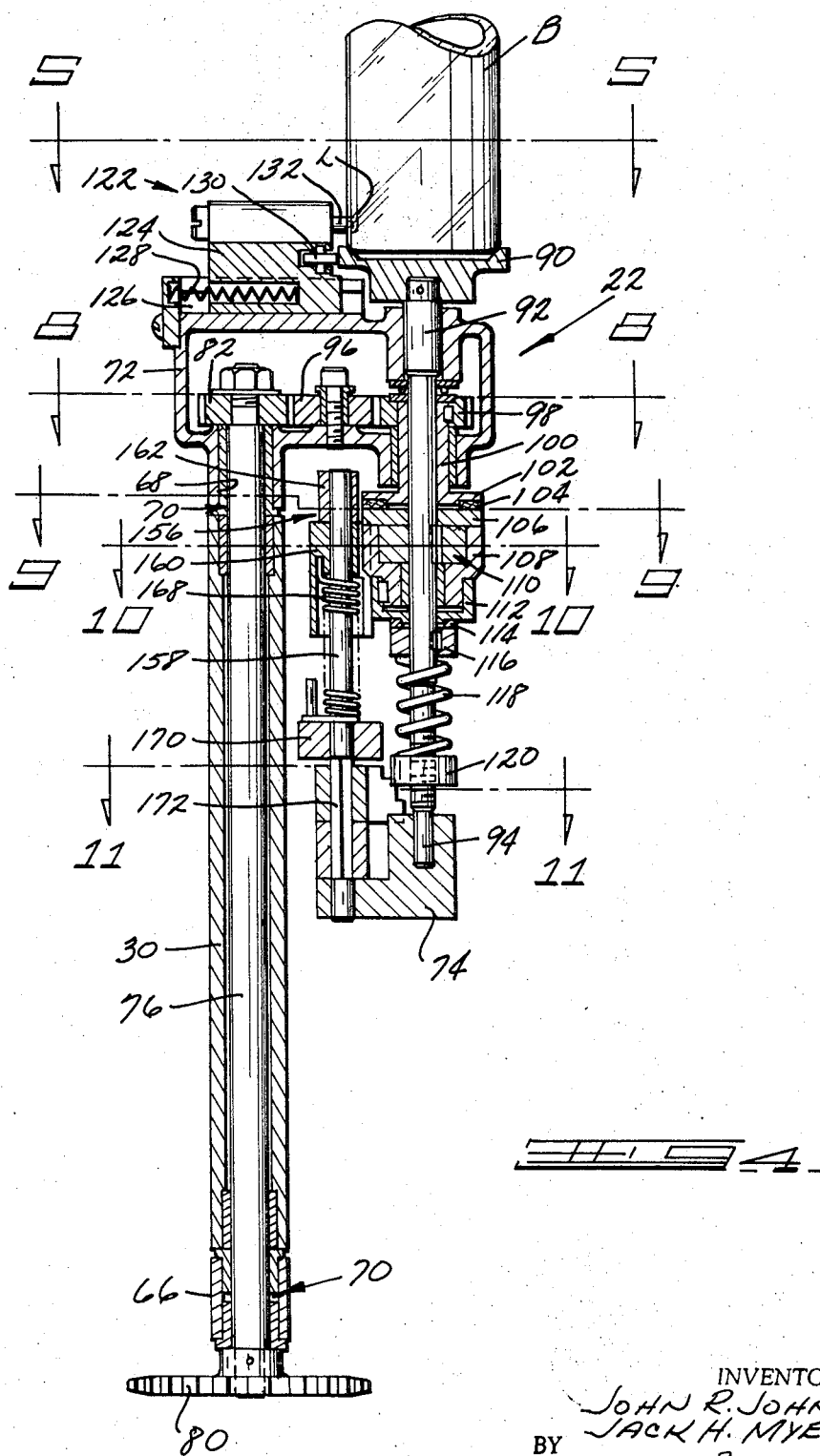

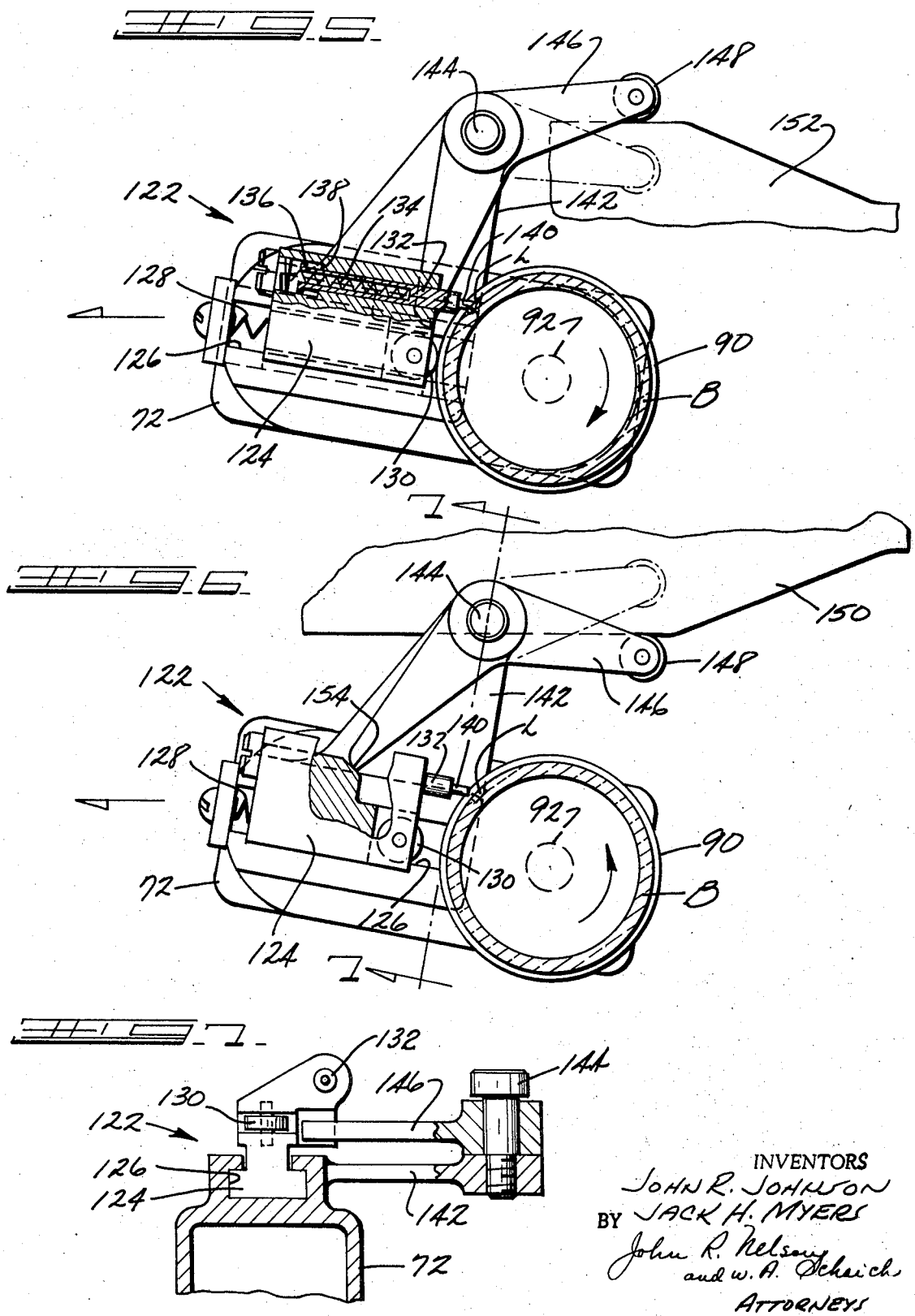

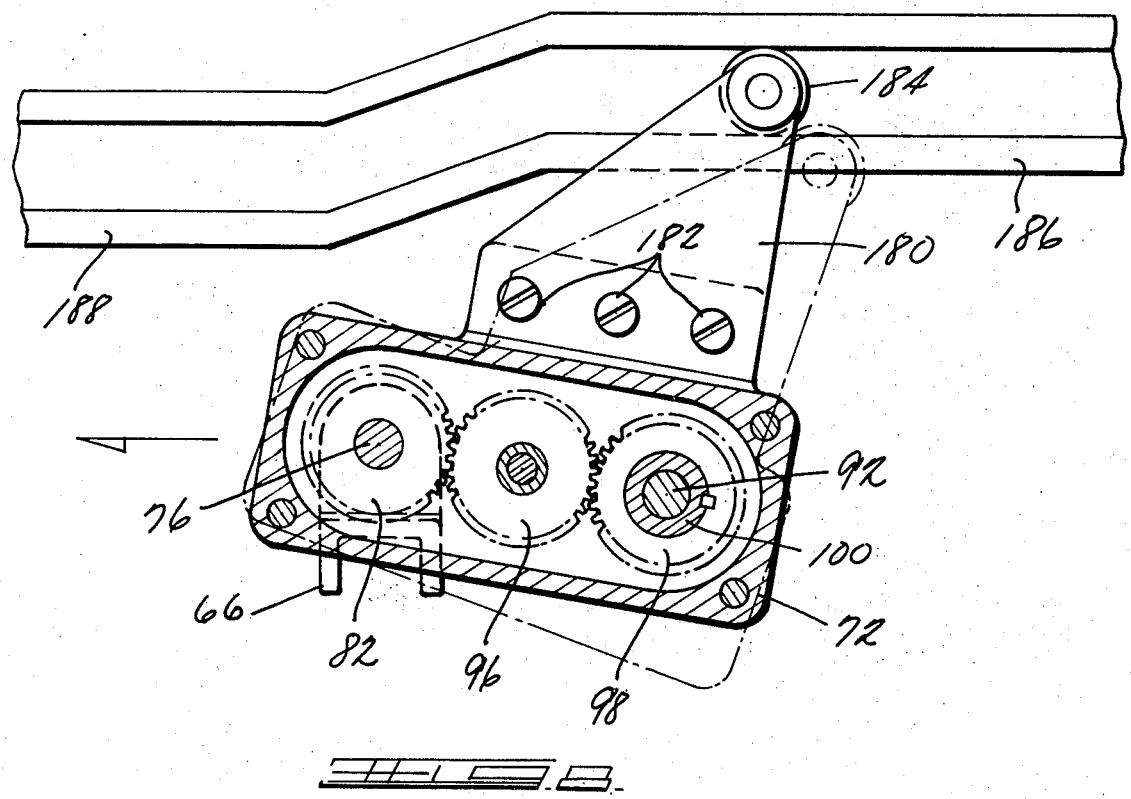

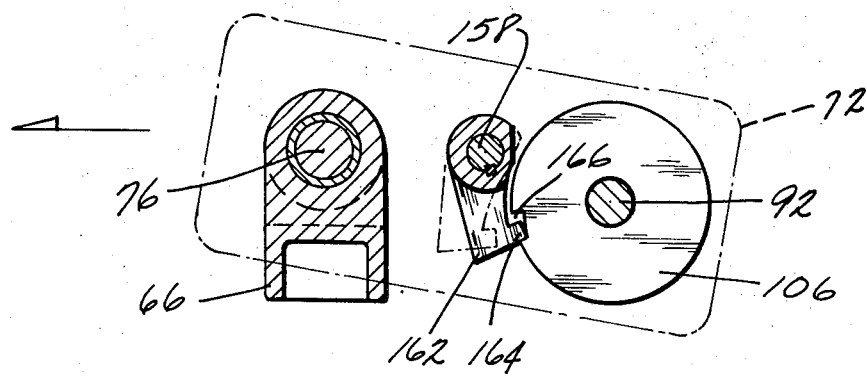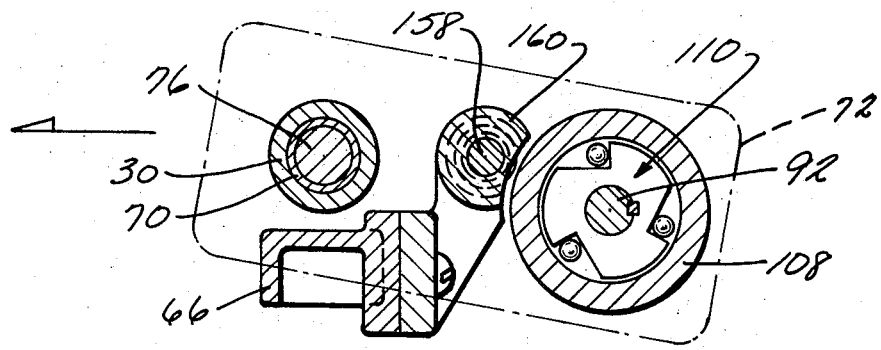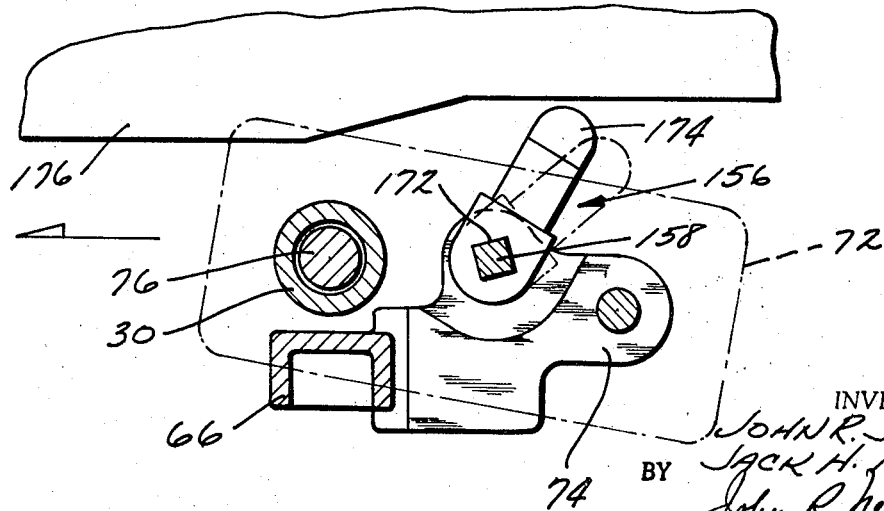

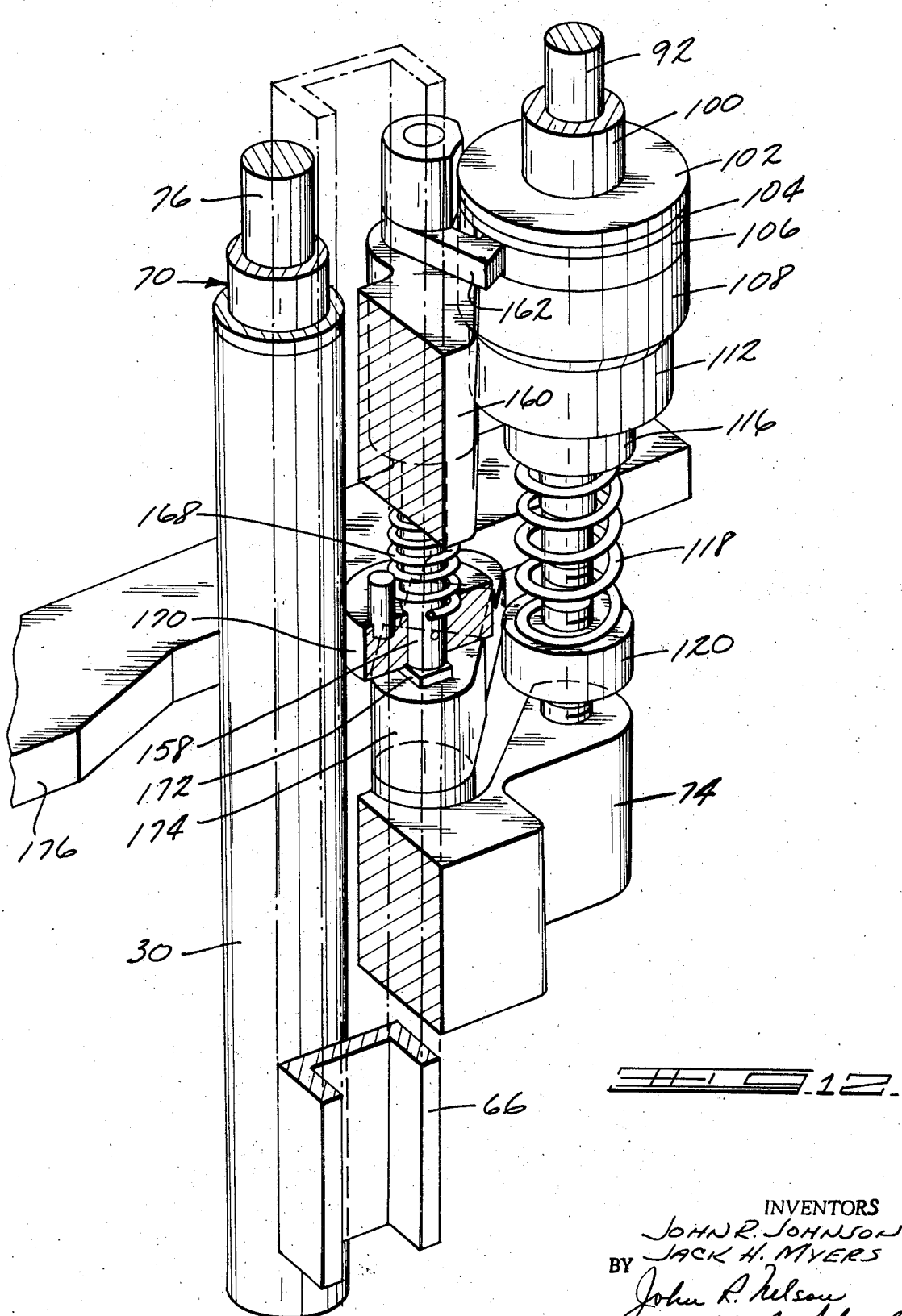

3,564,998

CHUCK FOR MANIPULATING BOTTLES IN A BOTTLE DECORATING APPARATUS

RELATED PATENTS AND APPLICATIONS

In its preferred embodiment herein illustrated, the present invention is adapted for use in advancing bottles into operative relationship with electrostatic printing apparatus of the type shown in U.S. Pat. Nos. 3,357,349; 3,387,557 and 3,461,795.

BACKGROUND OF THE INVENTION

The electrostatic printing apparatus disclosed in the aforementioned patents is of the offset type in which a powder image is applied to a flat offset printing element an and is then in turn electrostatically transferred to the surface of the article being decorated. In the case of cylindrical articles, such as bottles, the image is transferred from the offset printing element to the article surface by rolling the article laterally across the surface of the offset element in no-slip rotation.

In this respect, the invention is adaptable to other known offset or blanket printing systems.

In the formation of the bottle, the parting lines of the mold in which the bottle is formed result in the formation of an axially oriented, diametrically opposed pair of seams in the side or cylindrical body of the bottle, and it is normally desired to apply the label or other decoration to the bottle at a location such that a seam does not pass through the decorated region. To provide a means for rotatively orienting the bottle, most bottles are conventionally formed with a locating lug or notch near or in the base or heel of the bottle to provide a reference indicia from which the rotative orientation of the bottle can be determined.

The present invention is especially directed to a bottle supporting chuck assembly which can be employed to advance bottles in rapid succession into operative relationship with a substantially flat offset printing element and to roll the bottles laterally from a preselected rotative orientation across the surface of the offset printing element during the transfer of the image from the offset element to the bottle.

The chuck receives bottles at random rotative orientation with the bottles supported upon platform rotatable about an axis coincident with the axis of the bottle supported thereon. The chuck is mounted on an endless conveyor and, as the chuck is advanced by the conveyor from the location at which the bottle is placed upon the platform, a rotatable drive element on the chuck in the form of a sprocket engages a stationary chain extending along the conveyor path which drives the sprocket in rotation as the chuck is advanced. This rotation is transmitted to the bottle supporting platform through a relatively weakly engaged slip clutch, and the bottle is rotated until an orienting latch on the chuck engages the mentioned locating lug on the bottle. The orienting latch locks the bottle at its now rotatively oriented position, the slip clutch accommodating any further rotation of the sprocket which may occur.

The chuck is then advanced to the decorating station, at which an offset printing element is positioned at one side of the path of the bottle on the chuck at a location spaced outwardly from the normal path of the bottle, for reasons discussed below. As the chuck approaches the offset printing element, that portion of the chuck upon which the bottle is mounted is pivoted outwardly from its normal path into tangential relationship with the plane of the offset printing element. The drive sprocket is engaged with a second chain to drive the platform in rotation at a speed causing the bottle to roll laterally with no-slip contact across the surface of the offset printing element. A second latch in the platform drive train is maintained in engagement until released by a cam mechanism operated by the arrival of the bottle at a given point on its path relative to the decorating means. A second slip clutch in the drive train accommodates rotation of the drive sprocket prior to release of this latter latch.

In order to increase the rate of decoration, a multiple series of offset elements may be located at spaced locations along the conveying path. The mechanism which projects the bottle from its normal path to tangential relationship to the offset printing element may thus be arranged so that, in the case of two printing elements, bottles on alternate chucks of the conveyor are presented to each of two decorating elements. This arrangement accommodates closer relationship of the platforms on the conveyor for compactness of design and enhances higher decorating rates or output of the machine.

Various objects and other features of the invention will become apparent by reference to the following specification and to the drawings.

IN THE DRAWINGS

FIG. 1 is a top plan view in schematic form of a bottle decorating apparatus embodying the present invention;

FIG. 2 is a detail side elevational view of the chuck assembly of the present invention showing portions of the chuck-carrying conveyor and a bottle supported upon the chuck;

FIG. 3 is a detail cross-sectional view taken approximately on line 3-3 of FIG. 2;

FIG. 4 is a detail cross-sectional view taken approximately on line 4-4 of FIG. 3;

FIG. 5 is a detail cross-sectional view taken on line 5-5 of FIG. 4, with certain parts broken away or shown in section;

FIG. 6 is a view similar to FIG. 5 showing the parts at a different stage of the operation of the machine;

FIG. 7 is a detail cross-sectional view taken on line 7-7 of FIG. 6;

FIG. 8 is a detail cross-sectional view taken on line 8-8 of FIG. 4;

FIG. 9 is a detail cross-sectional view taken on line 9-9 of FIG. 4;

FIG. 10 is a detail cross-sectional view taken on line 10-10 of FIG. 4;

FIG. 11 is a detail cross-sectional view taken on line 11-11 of FIG. 4; and

FIG. 12 is a detail perspective view of a portion of the chuck assembly with certain parts broken away or omitted.

Referring first to FIG. 1, there is disclosed in schematic form a bottle decorating system which represents one form of use of the present invention. The system disclosed in FIG. 1 includes an endless conveyor (in phantom outline, at least in part) designated generally 20 upon which a plurality of bottle chuck assemblies 22 are mounted at uniformly spaced positions to be conveyed in a clockwise direction along the endless path of travel of the conveyor. Bottles to be decorated are placed upon the chuck assemblies 22 as they pass a schematically illustrated loading station. After being loaded upon the chuck, the bottle is rotatively oriented as it traverses that portion of the conveyor path generally indicated by the bracket 24 and is subsequently conveyed past an electrostatic printing apparatus designated generally 26 at which a label or decoration is electrostatically printed upon the bottles. Decorated bottles are subsequently unloaded from the chucks at a schematically illustrated unloading station.

The mechanism employed at the loading and unloading stations may be one that is conventional and well known in the art, and hence will not be described in detail. The electrostatic decorating apparatus 26 in the preferred embodiment illustrated, is somewhat more directly related to the present invention in that it requires the bottle to be presented to it at a selected rotative orientation, and, further that the bottles be engaged with the printing element 28 and rolled laterally in no-slip contact across the face of the printing element during the decorating operation. Further details of the electrostatic printing apparatus 26 may be found in U.S. Pat. Nos. 3,357,349; 3,387,557 and 3,461,795.

The present invention is primarily directed to a chuck mechanism for receiving bottles at random rotative orientations from the loading station, rotatively orienting the bottles, and driving the bottles in no-slip rolling contact laterally across the face of the decorating member. In the exemplary decorating apparatus of FIG. 1, a dual decorating apparatus is disclosed, each of the decorating elements 28 being operatively engaged with alternate bottles conveyed, as will be hereinafter described in greater detail. For this reason, it will be noted that the chuck assemblies 22 are shown with two different forms of cam arrangements, those with cam arrangements of one type having their bottles decorated at the right-hand decorating element 28, the remaining chucks having their bottles decorated at the left-hand decorating element 28 of FIG. 1.

The bottles which are handled by the present invention have a generally cylindrical body B (FIGS. 2 and 4) and are formed with a locating lug L (FIGS. 2 and 4) which may take the form of either a recess (indentation) or raised lug molded into the bottle during the forming operation. Either of these are conventional in bottle molding practice. The purpose of locating lug L is that of a reference point to enable the bottle to be rotatively oriented so that the label or decoration applied to the bottle is properly centered with respect to the seam inherently formed in the bottle during the molding operation.

The present invention is directly concerned with a lower chuck unit upon which the bottle is supported upon conveyor 20. In actual usage, a second or upper chuck assembly is also employed to engage the finish of the bottle, however, since the upper chuck assembly forms but a minor part in understanding the present invention, it has not been shown, for purposes of simplicity of illustration. However, in the following description, it should be borne in mind that the bottle, at all times, is engaged by an upper chuck so that it is axially clamped, with a fair degree of firmness, in position upon the lower chuck assembly disclosed in the drawings.

Referring now particularly to FIGS. 2, 3 and 4, each of the lower assemblies is constructed with a sleevelike support frame member 30, upon which are integrally formed upper and lower mounting plates 32 and 34 respectively. Upper and lower mounting plates 32 and 34 are bolted respectively to mounting brackets 36 and 38, respectively, which are in turn carried by upper and lower conveyor chains 40 and 42. Chains 40 and 42 are the operative endless elements of conveyor 20 and are operatively trained about end sprocket assemblies in a conventional manner to run in endless paths in vertically spaced horizontal planes. In FIG. 3, upper and lower end sprockets are shown at 44 and 46 respectively.

Each of mounting brackets 36 and 38 is formed with a rearwardly projecting arm 48, 50 respectively which carries a guide roller 52, 54 respectively engaged within a track such as 56, 58 fixedly mounted upon the frame of conveyor 20. Rollers 52 and 54 hold mounting brackets 36 and 38 against swinging movement upon their respective chains and, by virtue of the bolted assembly, thereby hold chuck support frame member 30 and carries against pivoting movement relative to conveyor chains 40 and 42. An arm 60 is integrally formed on support frame member 30 and carries a roller 62 at its outer end, roller 62 being engaged in a track 64 fixedly mounted upon the conveyor frame to support the weight of the chuck assembly.

Chuck 22 includes a main frame assembly having a vertically elongate support leg portion 66 (FIGS. 2 and 3) formed with bearing receiving bores 68 and 70 at its upper and lower ends. A main housing 72 fixedly secured to the upper end of leg 66, and a shaft support block 74 is fixedly mounted at an intermediate location along leg 66. The frame assembly which includes leg 66, housing 72 and support block 74 is mounted upon the sleevelike chuck support frame member 30 by a shaft 76 which is journaled for rotation in support frame member 30 and in bores 68 and 70 on support leg 66 as by bearing assemblies designated generally 78. Shaft 76 is retained axially in position by the engagement of a sprocket 80 fixedly secured to the lower end of shaft 76 and bearing against the lower bearing assembly 70 and at its upper end by a gear 82 rotatively locked to shaft 76 and bearing against the upper bearing assembly 70.

It is believed apparent from foregoing description that while support frame member 30 is effectively held stationary relative to conveyor chains 40 and 42, the secondary frame assembly consisting of leg 66, housing 72 and support block 74 can rotate relative to support member 30 about the vertical axis of shaft 76.

In addition to serving as a means for mounting support leg 66, housing 72 and support block 74 for pivotal movement about a vertical axis relative to the conveying chains, shaft 76 also functions as the main drive or input shaft to cause the required rotation of the bottle B supported upon the chuck assembly at appropriate locations along the path of the conveyor.

Referring now particularly to FIG. 4, it is seen that the bottle B is supported upon a platform 90 which is in turn fixedly mounted upon the upper end of a vertical shaft 92 rotatively journaled at its upper end in housing 72 and rotatively supported at its lower end in a bore 94 formed in support block 74.

Shaft 92 is driven in rotation by rotation of shaft 76 through a drive train which provides a relatively light frictional drive coupling for driving in one direction (clockwise rotation of shaft 92 as viewed from above) and through the more positive coupling of a one way or overrunning clutch for rotation in the opposite direction.

Rotation of shaft 76 is transmitted to shaft 92 by a drive train which includes an idler gear 96 rotatively mounted within housing 72 and meshed with gear 82 which is fixed to shaft 76. Idler gear 96 is in turn inmeshed with a gear 98 which is keyed to a sleeve 100 rotatively journaled upon shaft 92 and also rotatively supported in housing 72 so that gear 98 and its coupled sleeve 100 can rotate freely relative to both shaft 92 and housing 72.

At its lower end, sleeve 100 is formed with a radially projecting clutch plate 102 having an annular band of frictional material 104 bonded to its lower surface. The band of frictional material 104 in turn frictionally engages a plate 106 fixedly secured to the upper end of the outer sleeve 108 of a one way clutch. Plate 106 and the attached sleeve 108 can rotate freely in a clockwise direction (as viewed from above) relative to shaft 92 or, alternatively, are rotatively coupled to shaft 92 upon counterclockwise rotation of sleeve 108 by a one way clutch element in the form of a conventional notched hub and ball assembly designated generally 110 (see FIG. 10).

A secondary sleeve 112 is rotatively locked to the lower end of sleeve 108 and is frictionally coupled by a relatively small annular band of friction material 114 to a hub 116 which is keyed to shaft 92. A compression spring 118 bears against hub 116, which can slide axially on shaft 92 to provide an axial biasing force to thereby determine the degree of frictional coupling at the two slip clutch couplings defined by frictional elements 114 and 104. The compressive force of spring 118 is adjusted by a collar 120 threadably mounted upon shaft 92.

As will be described in greater detail below in connection with the description of the operation of the chuck, it is necessary at certain stages in the operation to hold the bottle in a selected rotative orientated position relative to the chuck and also to provide a positive locking action to prevent inadvertent rotation of platform 90 at certain stages of the operation. Two separate latching assemblies are employed; the two slip clutches provided by friction elements 104 and 114 providing the necessary slippage during those portions where one of the latches is engaged while a driving force is still applied to the assembly.

The first of these latch assemblies is the bottle orientation latch designated generally 122 and mounted at the top of housing 72 at one side of platform 90. Details of the bottle orientating latch 122 are best seen in FIGS. 4 through 7.

Referring first particularly to FIGS. 4 and 7, bottle orientating latch 122 includes a block 124 which is slidably mounted in a trackway 126 formed on the top of housing 72, trackway 126 extending radially relative to the axis of rotation of platform 90. A compression spring 128 resiliently biases block 124 toward platform 90, the limit of approach of block 124 to the platform being determined by the engagement between a roller 130 rotatably mounted in the block to roll along the side of platform 90. A pin 132 is slidably mounted within a bore in block 124 and is resiliently biased toward a bottle B supported on platform 90 by relatively light compression spring 134. An annular flange 136 at the left-hand end (FIG. 5) of pin 132 is engageable with a shoulder 138 formed in block 124 to limit the distance by which pin 132 can be projected from block 124 by spring 134. As best seen in FIG. 4, the elevation of pin 132 is somewhat above the top of platform 90 and corresponds to the elevation of the locating lug L formed in the bottle. Pin 132 is formed with a reduced diameter tip 140 which is capable of being received in the locating lug L of the bottle.

To retract pin 132 clear of the bottle, a projecting arm 142 is formed on housing 72 to provide a pivotal support 144 for a bell crank 146. One arm of bell crank 146 carries a cam follower roller 148 which rides along a cam track 150—152 fixedly mounted upon the frame of conveyor 20. When riding along the flat portion of cam track 152, see FIG. 5, the bell crank is pivoted clear of engagement with block 124 and compression spring 128 maintains block 124 at its forward limit of travel relative to platform 90. When in this position, pin 132 can engage a bottle supported on platform 90.

When roller 148 of bell crank 146 is engaged with a cam section 150 on the conveyor frame, the bell crank is rotated to the position shown in FIG. 6, in which the opposite arm of the bell crank engages a cam section 154 formed on block 124 to hold block 124 retracted against the action of compression spring 128 at a position such that pin 132, even when fully extended, is retracted clear of the bottle as shown in FIG. 6.

A positive rotative locking of shaft 92 is provided by what may be called the main drive latch assembly designated generally 156 and shown most clearly in FIG. 4 and FIGS. 9 through 11 inclusive.

Referring first to FIG. 4, the main drive latch 156 includes a shaft 158 rotatably supported at its lower end on support block 74 and rotatively journaled near its upper end in a fitting 160 which is fixed to housing 72. The latch member itself, 162 is keyed to shaft 158 immediately above fitting 160 and includes a latch tooth or pin 164 which is engageable within a notch 166 formed in plate 106 which, it will be recalled, is fixedly mounted upon the outer sleeve 108 of the one way clutch assembly. A torsion spring 168 is engaged between fitting 160 and a collar 170 rotatively fixed to shaft 158 to rotatively bias shaft 158 in a counterclockwise direction as viewed from above—i.e. latch tooth 164 is rotatively biased into engagement with plate 106.

As best seen in FIGS. 4 and 11, the lower end of shaft 158 is formed with a section of square cross section 172, upon which is mounted a latch retracting pawl 174. When pawl 174 is free (i.e. the full line position of FIG. 11), torsion spring 168 drives latch tooth 164 against plate 106.

A cam section 176 is formed on the frame of conveyor 20, and as a chuck assembly is conveyed along a section of the conveyor where cam 176 is projected, the tip of pawl 174 is engaged by the cam to thereby rotate shaft 172—158 in a clockwise direction, as viewed from above, thus retracting latch tooth 164 to the broken line position of FIG. 9, at which it is clear of plate 106.

In addition to a capability of rotating platform 90 and the supported bottle in either of two directions of rotation and of latching the bottle and a portion of the drive train, it is necessary during the decorating operation to provide for a shifting movement of the bottle transversely outwardly from the conveyor chains into operative relationship with the electrostatic printer. As described above, the exemplary decorating system disclosed in this application employs a dual printing station, each station printing alternate bottles on the conveyor. When the bottle is in its normal relationship to the conveyor, it will pass clear of a printing station; when the bottle is projected transversely outwardly from its normal path, it is positioned in operative relationship with the printer.

To accomplish this outward translation of the bottle, the capability of pivotal movement of housing 72 about the axis of shaft 76 is employed in the manner best seen in FIG. 8. A roller carrying plate 180 is bolted to housing 72 as by bolts 182 and rotatably carries a roller 184 at its outer end which is received in a track 186 mounted on the frame of conveyor 20. In FIG. 8, the housing is shown in its normal relationship relative to the path in which it is conveyed, further movement to the left as viewed in FIG. 8 will carry roller 184 out the incline section to a projected portion 188 of track 186, thereby rotating housing 72 into the broken line position shown in FIG. 8. It will be recalled that the bottle is supported upon a platform which is carried by shaft 92, hence movement of the housing into the broken line position of FIG. 8 shifts the bottle laterally outwardly from the normal conveyor path.

Referring now to FIG. 3, it will be noted that the bottle, as illustrated in this FIG., is in contact with a printing element 28, hence the roller 184 is illustrated as being in engagement with section 188 of the track.

To provide for the dual printing station arrangement, a second oppositely facing track 190 is provided upon the conveyor frame. By putting the arm 180 and roller 184 assembly on the housing in an upsidedown relationship to that shown in FIG. 8, the roller 184 can ride in track 190. This is done on alternate rollers, as indicated in FIG. 1.

OPERATION

Referring to FIG. 1, conveyor 20 is driven, by suitable means, not shown, in continuous movement to carry the chuck assemblies around the endless path indicated in FIG. 1 in a clockwise direction. Bottles are placed on the platform 90 of each chuck assembly as it passes the loading station, the placement of the bottles upon the chuck being at random rotative orientation. As the chuck approaches the orienting location 24 along the conveyor path, the main drive latch tooth 164 is retracted, while the sliding block 124 of the bottle orienting latch is in its forward position with the latch pin bearing against the side of the bottle. At this time, the latch pin will normally not be engaged in the locating lug due to the rotative placement of the bottle upon the chuck.

To rotate the bottle to the desired rotative orientation relative to the chuck, as the chuck enters the region 24 of the conveyor path, the teeth on sprocket 80 mesh with a stationary chain 200 fixedly mounted upon the conveyor base, and the forward movement of the chuck along the conveyor path thus causes sprocket 80 to be driven in rotation by the chain, which engages the sprocket on its inner side with relation to the conveyor. This causes sprocket 80, shaft 76 and its attached gear 82 to be driven in clockwise rotation, this rotation being reversed at idler gear 96 and again reversed into clockwise rotation at gear 98. Gear 98 drives the slip clutch element 104 to drive the outer sleeve 108 of the one way clutch, and this clockwise rotation is in turn transmitted by the second slip clutch element 114 through hub 116 to shaft 92, thus driving the bottle in clockwise rotation.

The bottle moves in clockwise rotation until the orienting latch pin 140 slips into the locating lug L on the side of the bottle, for example, see FIG. 5. With the latch seated in the locating lug, the bottle is held against further rotation and the frictional grip between the bottom of the bottle and platform 90 (augmented as will be recalled by downward pressure exerted by the top chuck assembly) thus stops further rotation of shaft 92. At this time, the sprocket 80 is still engaged with chain 200 and exerting a driving force, however this force is intercepted at slip clutch element 114, whose driving force is insufficient to overcome the frictional grip between the latched bottle and platform 90.

The clockwise driving of shaft 76 and the remaining drive train above slip clutch 114 is continued until the main drive latching tooth 164 seats in notch 166 on plate 106. If the engagement between sprocket 80 and chain 200 is still in effect, slip clutch element 104 permits slippage of the drive train above the slip clutch until the sprocket is disengaged from chain 200.

At this time, the bottle is in its desired rotative orientation (in registered position) upon the chuck and the chuck drive is latched.

AS the bottle approaches the decorating element 28, the bottle orienting latch (pin 132) is withdrawn by manipulation of bell crank 146 as shown in FIG. 6. Cam roller 184 moves along an incline section of its cam track to swing the chuck assembly outwardly from the conveyor to move the bottle into operative alignment with the decorating element 28. Approximately at this time, the sprocket 80 moves into engagement with an endless chain 202 which is operatively trained about a pair of end sprockets 204, 206, (FIG. 1) so that one run of the chain will engage the sprocket 80 as its associated chuck is carried past the decorating station. One of the end sprockets is driven from a drive motor 208 which is mechanically coupled to the sprocket preferably through an infinitely variable speed drive train 210 so that the speed of movement of chain 202 can be accurately adjusted.

The purpose of the engagement of the sprocket 80 with chain 202 is to drive the bottle supported upon the chuck assembly in counterclockwise rotation, as viewed from above, so that the bottle surface rolls laterally across the surface of offset element 28 in no-slip rotation. In order to accomplish this, the rate of rotation of the bottle required to produce the no-slip rolling movement across plate 28 is determined in accordance with the diameter of the bottle, thus the variable speed drive coupling 210 permits the rate of rotation of the chuck assembly to be adjusted by regulating the speed of chain 202 relative to the speed of movement of the chucks along their path. It is believed apparent that if chain 202 is driven at a speed and direction such that the run of chain 202 engaging sprocket 80 travels in the same direction and at the same speed as the chucks are moved along their path, no rotation of sprocket 80 would occur. The speed of rotation of sprockets 80, and hence the speed of rotation of the bottle, is thus dependent upon the algebraic difference between the linear speed of movement of the chucks and the linear speed of movement of the sprocket engaging run of chain 202.

It is believed apparent that a similar arrangement is employed at each decorating station, the individual chucks being latched and withdrawn at those stations where the decoration is not to be applied to the bottle on that particular chuck assembly.

The initial driving action of sprocket 80 at the decoration station is slipped at slip clutch 104 until latch pin 164 is retracted from notch 166 to rotatively free plate 106 and the attached outer sleeve of the one way clutch. As described above, latch pin 164 is retracted by the engagement of arm 174 with a cam track on the conveyor frame as shown in FIG. 11. This allows fixing of the spacial registration of the bottle with the decorating element and image thereon; and, of course, inasmuch as this cam track is adjustable in position along the conveyor frame or base, the registration of the decoration may be accurately and repetitively, reliably registered on the bottle.

With latch tooth 164 retracted, the counterclockwise rotative drive is transmitted by slip clutch 104 to the outer sleeve of the one way clutch which engages itself to transmit the drive directly to shaft 92 via the inner assembly 110 of the slip clutch. The speed of rotation of shaft 92 is regulated so that the bottle rolls laterally across the surface of decorating element 28 in a no-slip rotation.

After the decorating station has been cleared by the bottle, arm 174 (FIG. 11) is disengaged from the high section 176 of the cam track to thereby permit the latch to be biased toward its closed position. Relatching of the drive at this time is not overly critical, however it is desirable that the drive be relatched at some time before reloading of the chuck so that both orientation of the next bottle and latching of the drive can be achieved within a single revolution.

In the decorating station, other alternate decorating elements (28) may be provided and the chuck and bottle swing in and out by the type structure described and the principles taught herein so that multicolor, sequentially applied decorative images may be printed on the bottle in desired position, because the bottle and its chuck assembly are under positive mechanical control in the decorating station.

After the chuck leaves a decorating element (28) of the decorating station, the housing is swung back to its normal relationship relative to the conveyor path so that if the bottle carried by the chuck is decorated on the first or right-hand decorating station 28 of FIG. 1 it will clear the next successive decorating station.

While one embodiment of the invention has been disclosed, it will be apparent to those skilled in the art that the embodiment described may be modified. Therefore, the foregoing description is to be considered exemplary rather than limiting, and the true scope of the invention is that defined in the following claims.

We claim:

1. For use in combination with a bottle conveyor having a fixed frame, and conveying elements mounted upon said fixed frame for conveying movement along a given path; the improvement comprising a chuck assembly for supporting a bottle upon the conveyor for movement along the given path comprising a chuck frame assembly attachable to the conveying elements of said conveyor for movement therewith, a drive member rotatively mounted in said chuck frame assembly, one way clutch means including an input member and an output member rotatively mounted on said chuck frame assembly and means for rotatively coupling said input member to said output member only upon rotation of said input member in a first direction, a bottle-supporting platform mounted upon said output member for rotation therewith about a first axis and adapted to support a bottle having a vertical axis of symmetry upon said chuck assembly for movement therewith and for rotation about its axis of symmetry in coaxial relationship with said first axis, the bottle to be supported upon said platform having locating lug means thereon exposed when the bottle is supported upon the platform, first slip clutch means for rotatively frictionally coupling said input member to said output member, second slip clutch means for rotatively coupling said drive member to said input member, first releasable latch means on said chuck frame assembly engageable with the locating lug means on a bottle supported upon said platform and operable when so engaged to cause slippage of said first clutch means, second releasable latch means on said chuck frame assembly engageable with said input member and operable when so engaged to cause slippage of said second slip clutch means, and means on said fixed frame of said conveyor for releasing said second latch means at selected positions along said given path.

2. The invention defined in claim 1 wherein said drive member comprises a drive shaft supported in said chuck frame assembly for rotation about a second axis, a rotary drive element fixed to one end of said shaft, and means on said fixed frame of said conveyor engageable with said rotary drive element at selected locations along said given path to drive said rotary drive element and shaft in rotation about said second axis as said chuck assembly is moved by said conveying elements past said locations.

3. The invention as defined in claim 2 wherein said means on said fixed frame of said conveyor comprises first means at a first location on said path engageable with one of said rotary drive elements at one side of said second axis to drive said rotary drive element and shaft in one direction of rotation about said second axis, and a second means at a second location on said path engageable with said rotary drive element at the opposite side of said second axis to drive said rotary drive element and shaft in the opposite direction of rotation about said second axis.

4. The invention defined in claim 1 wherein said chuck frame assembly comprises a first frame member fixedly attached to one of said conveying elements of said conveyor for movement therewith, a second frame element mounted on said first frame element for pivotal movement about a second axis offset from said first axis, and cooperating means on said second frame element and said fixed frame of said conveyor for pivoting said second frame element about said second axis at selected locations along said given path.

5. The invention defined in claim 4 wherein said drive member comprises a drive shaft journaled for rotation in said first and said second frame members of said chuck assembly for rotation about said second frame member axis, said drive shaft coupling said first and said second frame members to each other.

6. In a bottle decorating system having endless conveyor means including a fixed conveyor frame and conveying elements mounted on said frame for movement along an endless path, loading means at a first location on said path for loading bottles to be decorated onto said conveyor means with said bottles at random rotative orientations, unloading means at a second location on said path for removing bottles from said conveyor means, and decorating means at a third location on said path for decorating bottles on said conveyor means during their movement along said path from said loading station to said unloading station, said bottles having a vertical axis of symmetry and locating lug means thereon; the improvement comprising a plurality of chucklike assemblies mounted on said conveying elements for movement therewith at uniformly spaced positions thereon, each of said chuck assemblies including a chuck frame assembly, a bottle supporting platform mounted on said chuck frame assembly for rotation about a first axis coaxial with the axis of symmetry of a bottle supported thereon, a drive member rotatively mounted in said chuck frame assembly, a drive element mounted on said conveyor frame at a location on said path between said loading station and said decorating means and engageable with said drive member to rotate said drive member as said drive member is carried past said drive element by movement of said conveying elements, bottle orienting means on said chuck assembly including an orienting element engageable with the locating lug on a bottle supported on said platform, drive train means for transmitting rotation of said drive member to said platform to rotate said platform and the bottle supported thereon until said orienting element is engaged with said locating lug means on said bottle to thereby rotatively orient the bottle relative to said chuck assembly, and latch means for latching the drive member at a selective rotative orientation relative to said chuck frame assembly after the bottle has been rotatively oriented.

7. The invention as defined in claim 6 wherein said drive train means comprises a slip clutch rotatively coupling said drive member to said platform, said orienting element when engaged with the locating lug means on said bottle being operable to cause slippage of said slip clutch during rotation of said drive member subsequent to the engagement of the orienting element with the locating lug means.

8. The invention as defined in claim 7 further comprising a second drive element mounted on said conveyor frame at said decorating station and engageable with said drive member to rotate said drive member as said drive member is carried past said second drive element by movement of said conveyor elements, said second drive element being operable to rotate said drive member in a direction opposite to that which said drive member is rotated by the first mentioned drive element, said drive train means including a one way clutch operable to transmit rotation of said drive member by said second drive element to said platform whereby said platform is driven by said slip clutch during the rotative orientation of said bottle and said platform is driven by said one way clutch as the bottle is carried past said decorating means.

9. The invention as defined in claim 8 wherein said platform is mounted upon a platform shaft journaled for rotation in said chuck frame assembly, said one way clutch having an input member and an output member, means coupling said one way clutch input member to said drive member, said one way clutch output member being mounted upon said platform shaft, a hub rotatively locked to said platform shaft, and friction means engaged between said one way clutch input member and said hub to constitute said slip clutch.

10. The invention as defined in claim 9 wherein said means coupling said one way clutch input member to said drive member comprises a second slip clutch, and releasable latch means on said chuck frame assembly operable to latch said one way clutch input member against rotation to cause slippage of said second slip clutch means.

11. In an apparatus for applying a decoration to a selected circumferential portion of a generally cylindrical bottle having a vertical axis of symmetry and locating lug means thereon, said apparatus including conveyor means for conveying a bottle along a given path, decoration applying means including a decorating element having a generally flat surface located adjacent one side of and extending parallel to said path, and bottle supporting and manipulating means for rolling a bottle on said conveying means laterally across the surface of the decorating element as the bottle is carried past the decorating element by the conveyor means to apply a decoration to a preselected portion of the bottle circumference; the improvement wherein said bottle supporting and manipulating means comprises chuck means mounted on said conveyor means for movement along said path, said chuck means having a frame, a platform mounted in said frame for rotation about a first axis and adapted to support a bottle thereon with the axis of symmetry of the bottle coaxial with said first axis, a drive member journaled for rotation in said chuck frame, drive train means mounted on said chuck frame for rotatively coupling said drive member to said platform to rotate said platform, bottle orienting means on said chuck assembly including an orienting element engageable with said locating lug means, of a bottle on said conveying means, first means operable during the approach of said bottle toward said decoration applying means to rotate said platform and thereby rotate said bottle placed on said platform at a random rotative orientation about said first axis into a preselected rotative orientation relative to said chuck frame whereat said element and lug means are engaged, latch means for latching the drive member at a preselected rotative orientation relative to said chuck frame assembly after the bottle has been rotatively oriented, second means for rotating said drive member while said chuck means is being conveyed along said path past said decoration applying means to roll the bottle about its axis of symmetry from said preselected rotative orientation laterally across the surface of the decorating element.

12. The invention defined in claim 11 wherein said drive member includes a drive sprocket mounted for rotation about a second axis, said first means including a first stationary chain mounted along said path and engageable with said sprocket at one side of said second axis as said sprocket is carried past said first chain by said conveyor means, and said second means includes a second chain mounted along said path adjacent said decoration applying means and engageable with said sprocket at the opposite side of said second axis as said sprocket is carried past said second chain by said conveying means whereby said platform and bottle are rotated in a first direction about said first axis to rotatively orient the bottle and are rotated in the opposite direction while rolled across said decoration element.

13. The invention defined in claim 12 wherein said drive train means includes slip clutch means for transmitting rotation of said drive member to said platform when said sprocket is engaged with said first chain, and latch means on said chuck frame engageable with the locating lug means on said bottle for causing slippage of said slip clutch means when said bottle is located in said preselected rotative orientation.

14. The invention defined in claim 13 wherein said drive train means comprises a one way clutch for transmitting rotation of said drive member to said platform to rotate said platform in said opposite direction.

15. The invention defined in claim 14 wherein said drive train means further comprises second latch means located in said drive train means between said sprocket and said one way clutch and operable when engaged to latch said drive train means against rotation, and second slip clutch means in said drive train means between said sprocket and said second latch means for accommodating rotation of said sprocket during engagement of said second latch means.

16. The invention defined in claim 12 wherein said chuck frame comprises a first frame element fixedly mounted on said conveying means for movement therewith, a second frame element having said drive train means and said platform mounted thereon and mounted upon said first frame element for pivotal movement about a second axis parallel to and offset from said first axis, and means on said second frame element engageable with cam means extending alongside said path for pivoting said second frame element about said second axis between a normal conveying position and an outwardly projected decorating position.

17. The invention defined in claim 16 wherein said drive member comprises a drive shaft coupling said first and second frame elements to each other.

18. A bottle chuck assembly comprising a chuck frame, a drive member rotatively mounted in said chuck frame, one way clutch means including an input member and an output member rotatively mounted on said chuck frame assembly and means for rotatively coupling said input member to said output member only upon rotation of said input member in a first direction, a bottle-supporting platform mounted upon said output member for rotation therewith about a first axis and adapted to support a bottle having a vertical axis of symmetry upon said chuck assembly for rotation about its axis of symmetry in coaxial relationship with said first axis, the bottle to be supported upon said platform having locating lug means thereon, first slip clutch means for rotatively frictionally coupling said input member to said output member, second slip clutch means for rotatively coupling said drive member to said input member, first latch means on said chuck frame engageable with the locating lug means on a bottle supported upon said platform and operable when so engaged to cause slippage of said first clutch means, and second latch means on said chuck frame assembly engageable with said input member and operable when so engaged to cause slippage of said second slip clutch means.